(12) United States Patent
Boisnier

(10) Patent No.: US 10,535,983 B2
(45) Date of Patent: Jan. 14, 2020

(54) ELECTRICAL CABINET WITH CIRCUIT BREAKERS MOUNTED IN THE DOOR

(71) Applicant: SAFRAN ELECTRICAL & POWER, Blagnac (FR)

(72) Inventor: Benjamin Boisnier, Colomiers (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/781,234

(22) PCT Filed: Dec. 5, 2016

(86) PCT No.: PCT/FR2016/053202
§ 371 (c)(1),
(2) Date: Jun. 4, 2018

(87) PCT Pub. No.: WO2017/098121
PCT Pub. Date: Jun. 15, 2017

(65) Prior Publication Data
US 2018/0358786 A1 Dec. 13, 2018

(30) Foreign Application Priority Data

Dec. 7, 2015 (FR) .................................... 15 61940

(51) Int. Cl.
*H02B 1/056* (2006.01)
*H02B 1/38* (2006.01)
(Continued)

(52) U.S. Cl.
CPC ............... *H02B 1/056* (2013.01); *H01H 9/22* (2013.01); *H01H 71/128* (2013.01); *H02B 1/38* (2013.01); *H01H 2071/006* (2013.01)

(58) Field of Classification Search
CPC .... H05K 5/02; H05K 7/02; H02B 1/04–0526; H02B 1/20; H02B 1/056;
(Continued)

(56) References Cited

U.S. PATENT DOCUMENTS 2,204,002 A * 6/1940 Rowe ...................... H01H 9/102
200/50.14
2,934,679 A * 4/1960 Johnson ................. H02B 1/056
174/59
(Continued)

FOREIGN PATENT DOCUMENTS

FR 2 746 543 A1 9/1997

OTHER PUBLICATIONS

International Search Report for International Application No. PCT/FR2016/053202 dated Mar. 3, 2017.
(Continued)

*Primary Examiner* — Daniel P Wicklund
*Assistant Examiner* — Amir A Jalali
(74) *Attorney, Agent, or Firm* — Pearne & Gordon LLP

(57) ABSTRACT

An electrical cabinet includes circuit breakers that can be snap-fitted onto a door hinged to a body of the cabinet and equipped with electrical connectors connected to portions of electrical circuits inside the door. The portions connect to fixed portions of the electric circuit, via other connectors, when the cabinet is closed.

17 Claims, 6 Drawing Sheets

Figure 1:
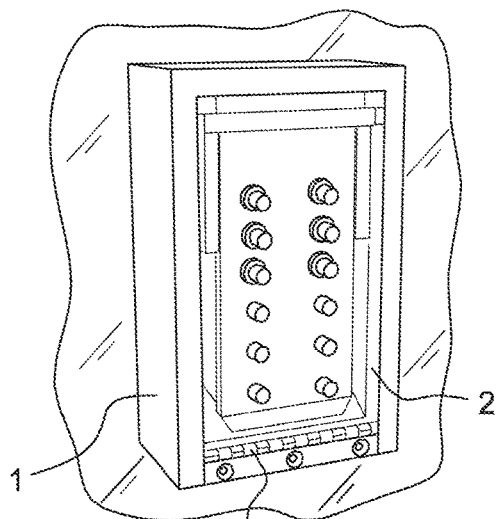

(51) Int. Cl.
*H01H 9/22* (2006.01)
*H01H 71/12* (2006.01)
*H01H 71/00* (2006.01)

(58) Field of Classification Search
CPC . H02B 1/38; H02B 1/306; H02B 1/32; H02B 1/044; H02B 1/44; H01H 9/22; H01H 71/08; H01H 71/128; H01H 71/0264; H01H 2071/006; H01H 2300/056
USPC .................................. 361/634–636, 652–656
See application file for complete search history.

(56) References Cited

U.S. PATENT DOCUMENTS

| | | | | |
|---|---|---|---|---|
| 3,175,126 | A * | 3/1965 | Hardwick | H02B 1/42 |
| | | | | 361/616 |
| 3,207,880 | A * | 9/1965 | Mekelburg | H01H 9/22 |
| | | | | 200/330 |
| 3,343,042 | A * | 9/1967 | Cellerini | H01H 71/04 |
| | | | | 200/50.21 |
| 4,002,865 | A * | 1/1977 | Kuhn | H02B 11/133 |
| | | | | 200/50.22 |
| 4,017,698 | A * | 4/1977 | Kuhn | H02B 11/133 |
| | | | | 200/50.21 |
| 4,718,740 | A * | 1/1988 | Cox | G06F 1/16 |
| | | | | 312/223.2 |
| 5,061,023 | A * | 10/1991 | Soubliere | E05D 1/04 |
| | | | | 16/355 |
| 5,597,991 | A * | 1/1997 | Chen | H01H 9/22 |
| | | | | 200/50.02 |
| 6,878,891 | B1 * | 4/2005 | Josten | H02B 13/025 |
| | | | | 200/293 |
| 9,843,171 | B2 * | 12/2017 | Richards | H02B 1/36 |
| 2014/0111345 | A1 | 4/2014 | Mills et al. | |
| 2014/0126119 | A1 * | 5/2014 | Mills | H02B 1/04 |
| | | | | 361/636 |
| 2016/0149342 | A1 * | 5/2016 | Rodriguez | H01R 13/62922 |
| | | | | 439/157 |
| 2016/0315454 | A1 * | 10/2016 | Martinez-Cruz | H02B 13/005 |

OTHER PUBLICATIONS

Written Opinion for International Application No. PCT/FR2016/053202 dated Mar. 3, 2017.
French Search Report issued in Patent Application No. FR 15 61940 dated Jun. 3, 2016.
Application document as-filed for patent application entitled: Insulator for a Pivotable Electrical Connection, U.S. Appl. No. 15/744,549, filed Jan. 12, 2018.
Application document as-filed for patent application entitled: Freely Translatable Electrical Connection Device Having Protection Against Damage From Foreign Bodies, U.S. Appl. No. 15/744,907, filed Jan. 15, 2018.
Application document as-filed for patent application entitled: Electrical Connection Device Connectable to Multiple Cables With Protection Against Damage From Foreign Bodies, U.S. Appl. No. 15/742,753, filed Jan. 8, 2018.

* cited by examiner

ELECTRICAL CABINET WITH CIRCUIT BREAKERS MOUNTED IN THE DOOR

The subject matter of the invention is an electrical cabinet comprising circuit breakers mounted in the door.

In such a known cabinet, the circuit breakers are screwed through the door. The cables of the electrical circuits passing through the circuit breakers include, in addition to the main parts integral with the cabinet body, parts connected to the circuit breakers and freely placed in the inner volume of the cabinet, such that they can be deformed and follow the circuit breakers when the cabinet's door is open. These free parts of the circuits are joined in a bundle, called a harness, and they are united to the circuit breakers by holding nuts.

This design can be criticised for various drawbacks. Some are related to the electrical risks due to the intrusion of foreign bodies, mainly conductive bodies, which can in particular become lost nuts or screws during assemblies and disassemblies. The systematic use of screwing is further disadvantageous in that it forces to resort to particular tools and imposes long assembly times. Other drawbacks come from the harness of the electrical cables movable inside the cabinet, which further imposes assembly precautions, and occupies a significant volume.

The invention enables these drawbacks to be avoided, by removing, partly or completely, resorting to screwed joints between the door, circuit breakers and electrical circuits, as well as enabling the harness to be removed.

Under a general form, it relates to an electrical cabinet, comprising a cabinet body and a door movable on the cabinet body between a cabinet closing position and an opening position, circuit breakers mounted to the door and extending in the cabinet when the door is closed, and electrical circuits each comprising a first part attached to the cabinet body, and a second part passing through a respective circuit breaker, characterised in that the second parts are fastened to the door and extend between first connectors, connected to first complementary connectors, attached to the first parts of the circuit, in the closing position, and second connectors, connectable to second complementary connectors attached to the circuit breakers.

The harness of electrical cables which is movable in the cabinet is thus replaced by circuit portions incorporated to the door. Their connection with the rest of the circuits is restored as soon as the door is closed, by joining the first connectors to the second connectors by virtue of the movement of the door along its closing trajectory. It is to be noted that the electrical insulation of the circuit breakers is also automatically achieved, as soon as the door is open, which is very advantageous for safety, the replacements of the circuit breakers, for example, being possibly made without risk.

Moreover, in preferred embodiments of the invention, the circuit breakers are mounted by a sliding movement in the cells formed on the inner face of the door, and this movement is accompanied by an automatic connection of the second connectors which join them to the electrical circuits. A much safer and easy assembly is thus further achieved, by abandoning the screwed connections between the circuit breakers and the electrical circuits.

If the door includes such cells for guiding the switches, the door and switches can include interlocking means. The interlocking enables the joining of the circuit breakers to the door by screwing to be dispensed with and thus greatly improves assembly easiness, which is possible to make without tools, as well as safety, by avoiding loss of objects in the cabinet upon screwing.

Advantageously, the second parts of the circuits are built in the door, which has a laminated structure with superimposed layers, the second parts possibly including either bus bars, or printed circuits, and thereby also possibly being incorporated either to intermediate layers of said structure either to inner faces of end layers of said structure.

Among other advantageous particular embodiments of the invention, those which comprise a hinge joining one end of the door to the cabinet body, and where the door comprises a latching handle provided with a relief nested with a complementary relief fastened to the cabinet body in a closing and latching position of the door can be mentioned.

These various alternative embodiments of the invention, as well as others that will be described thereafter, can generally be combined freely between each other.

Figure 2:
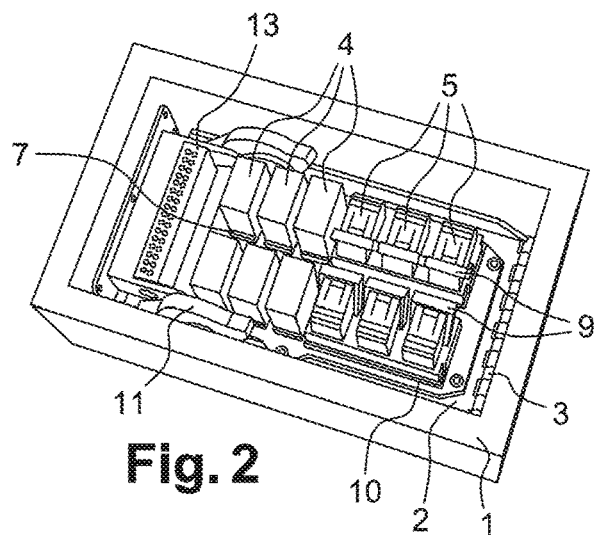
Figure 3:
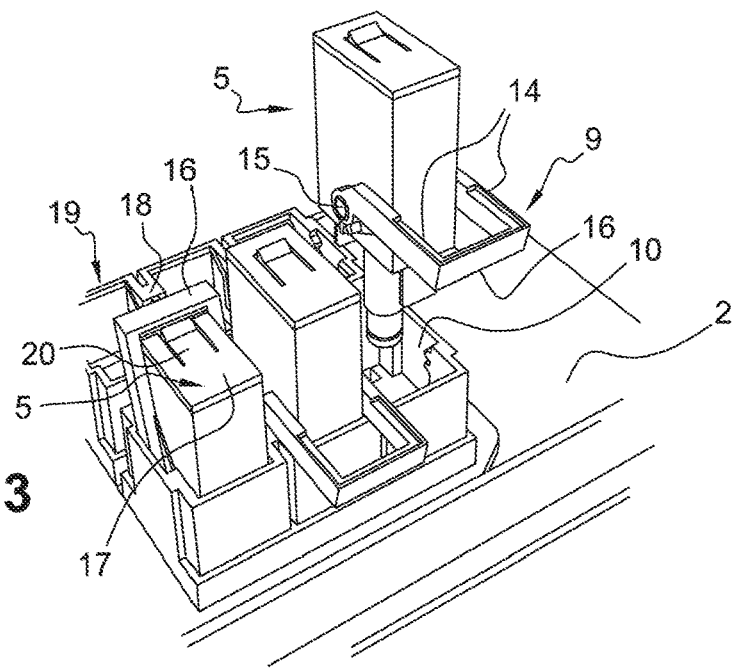
Figure 4:
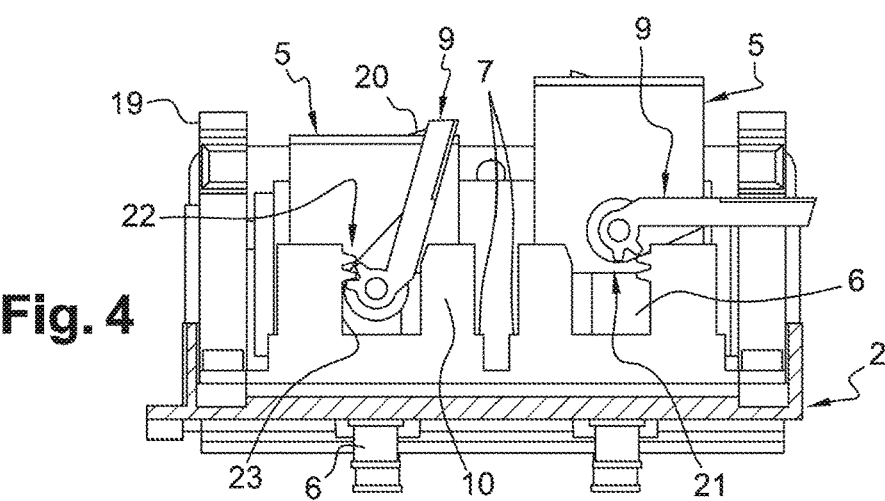
Figure 5:
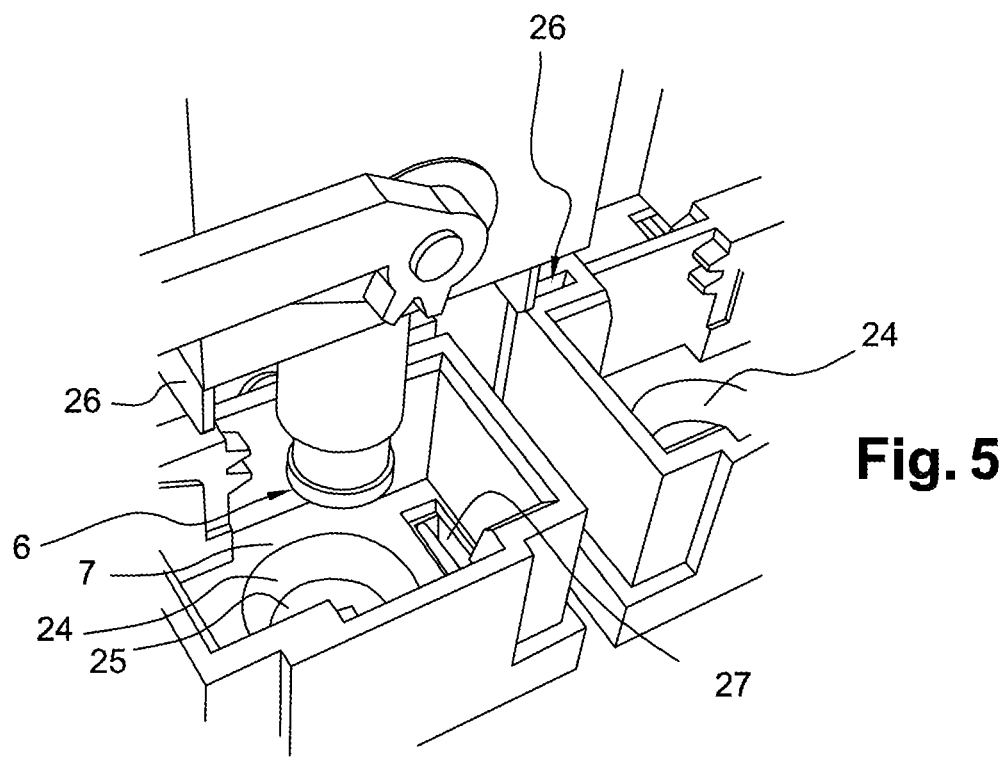
Figure 6:
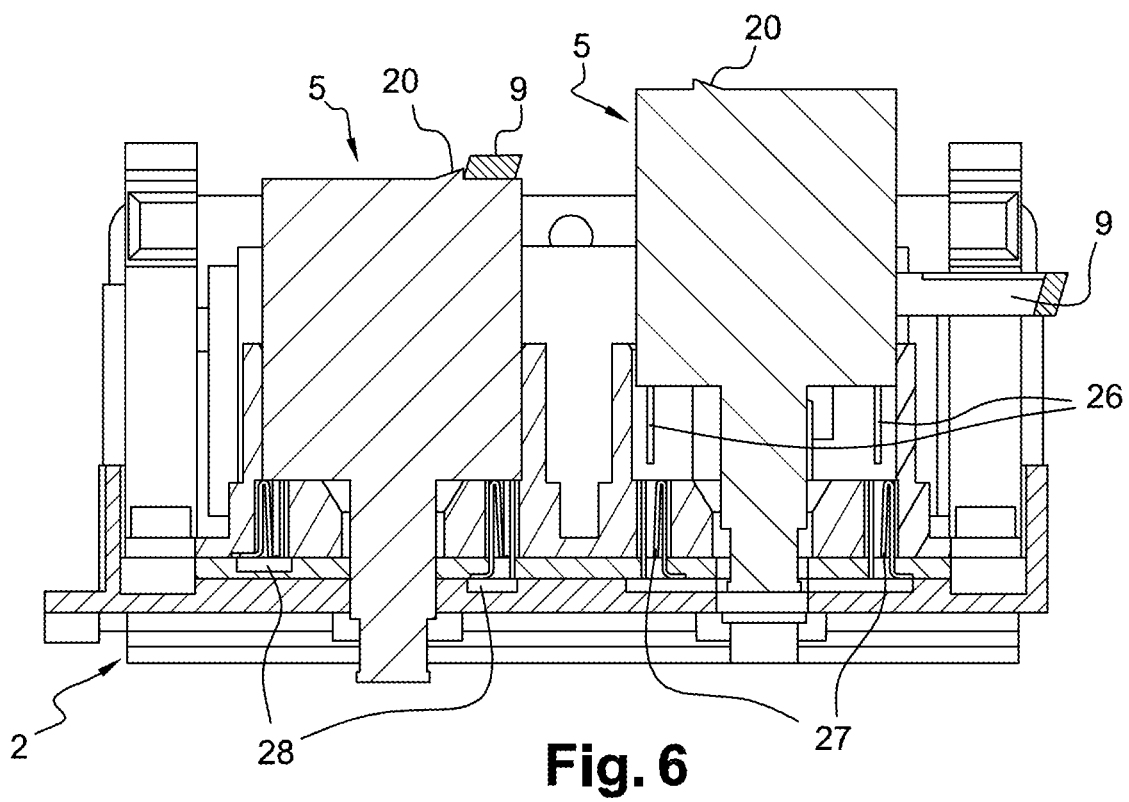
Figure 7:
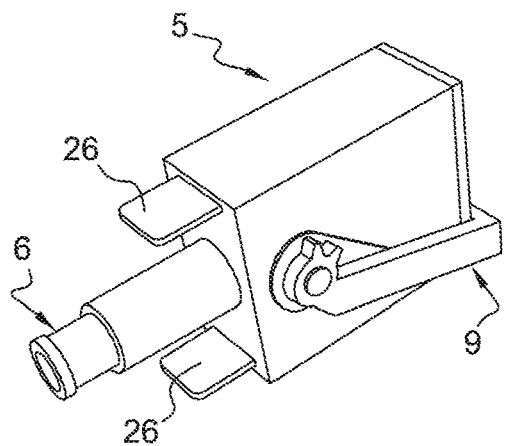
Figure 8:
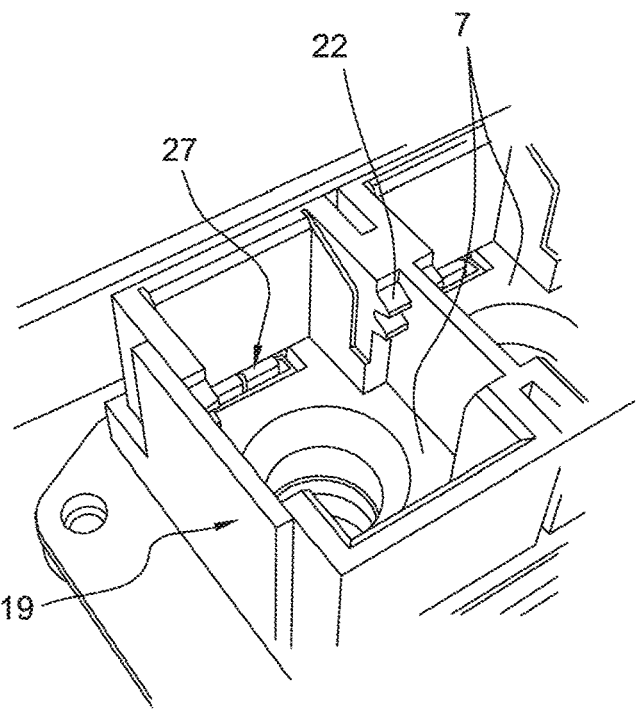
Figure 9:
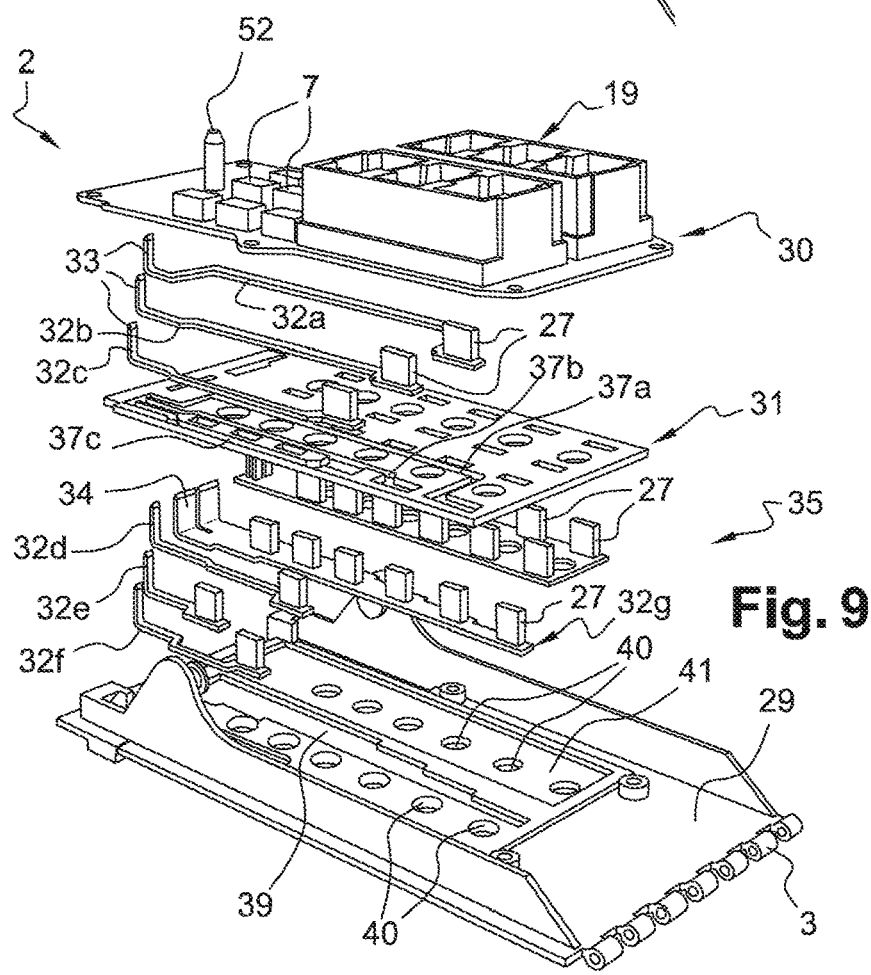
Figure 10:
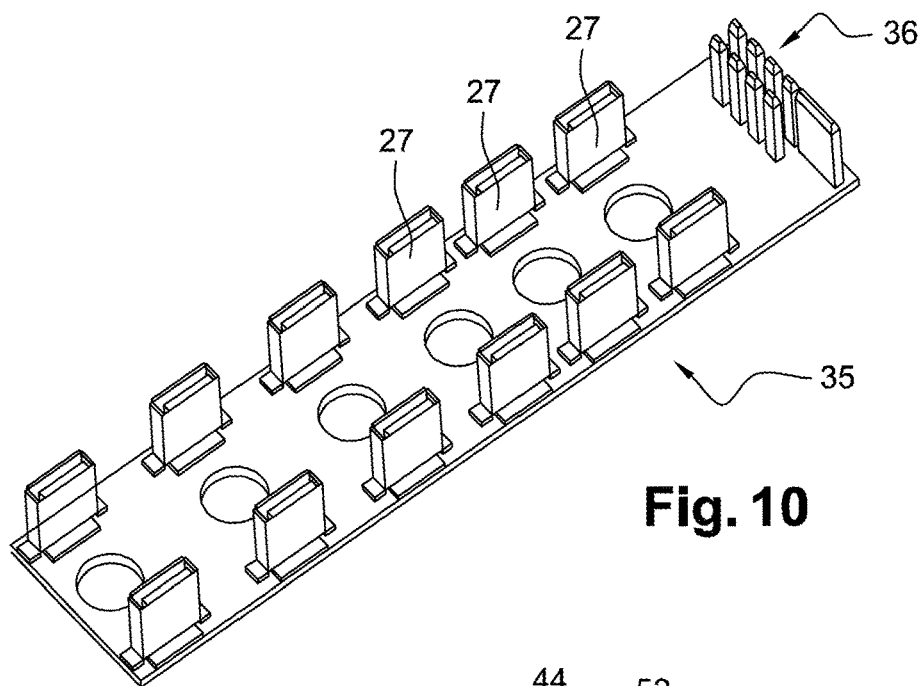
Figure 14:
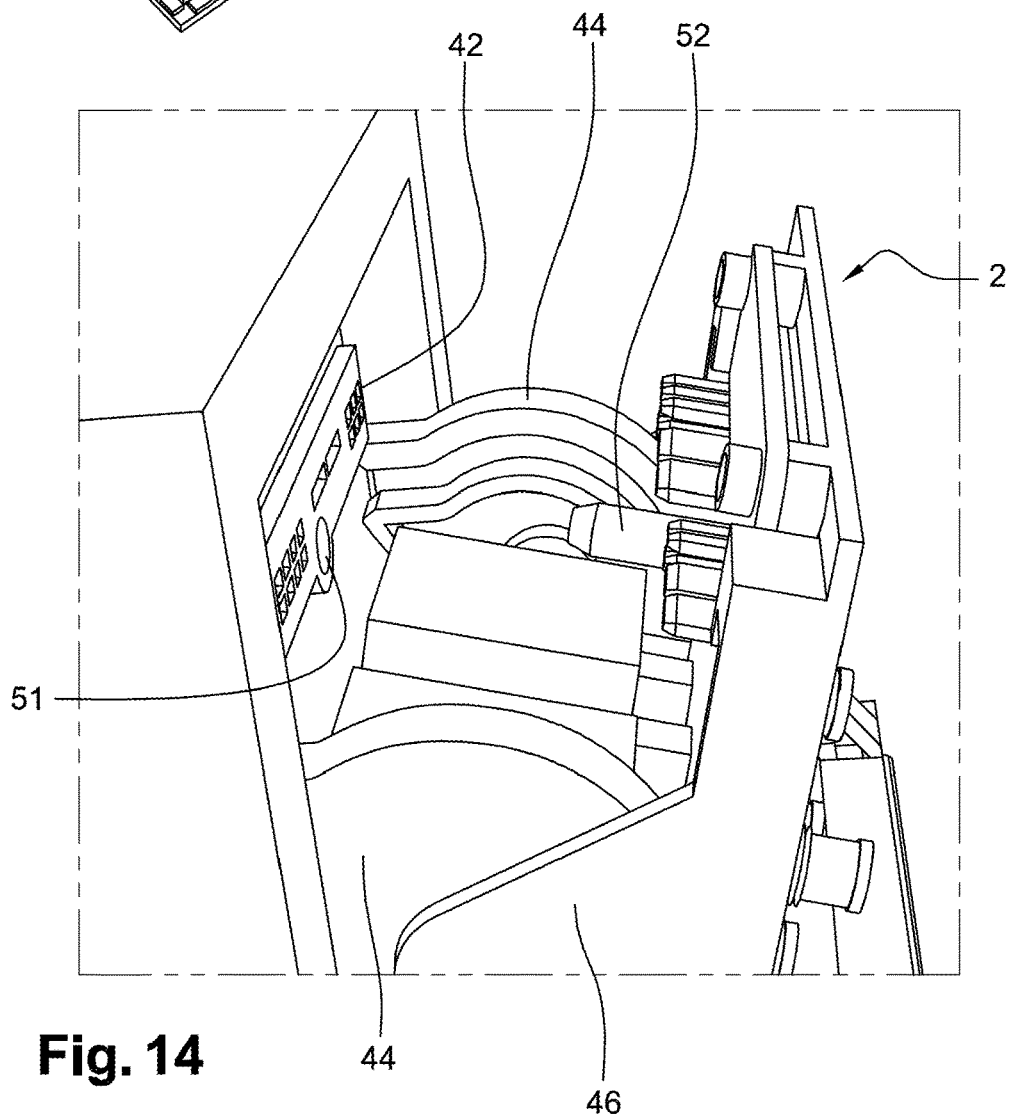
Figure 11:
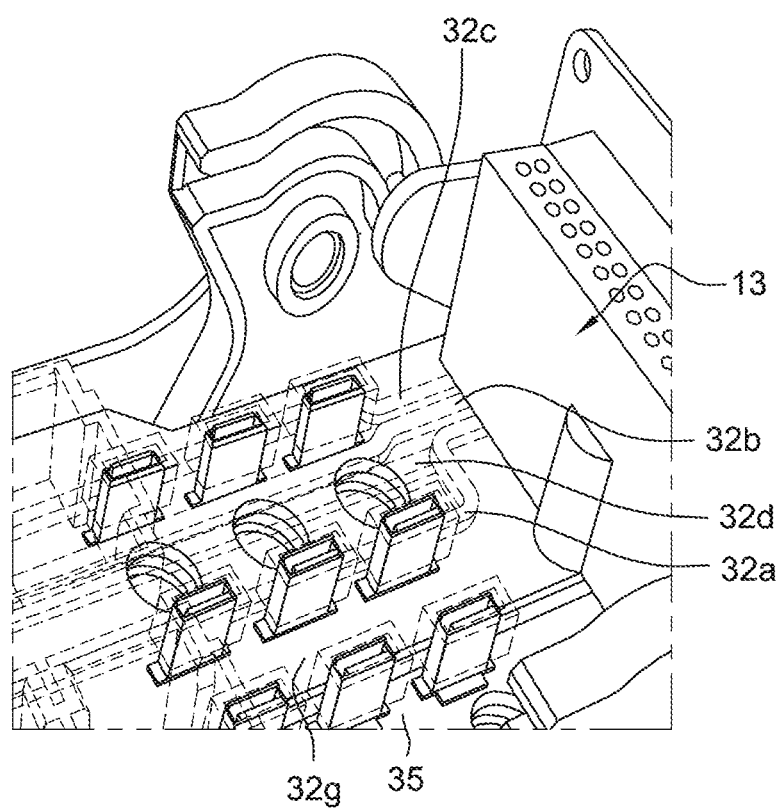
Figure 12:
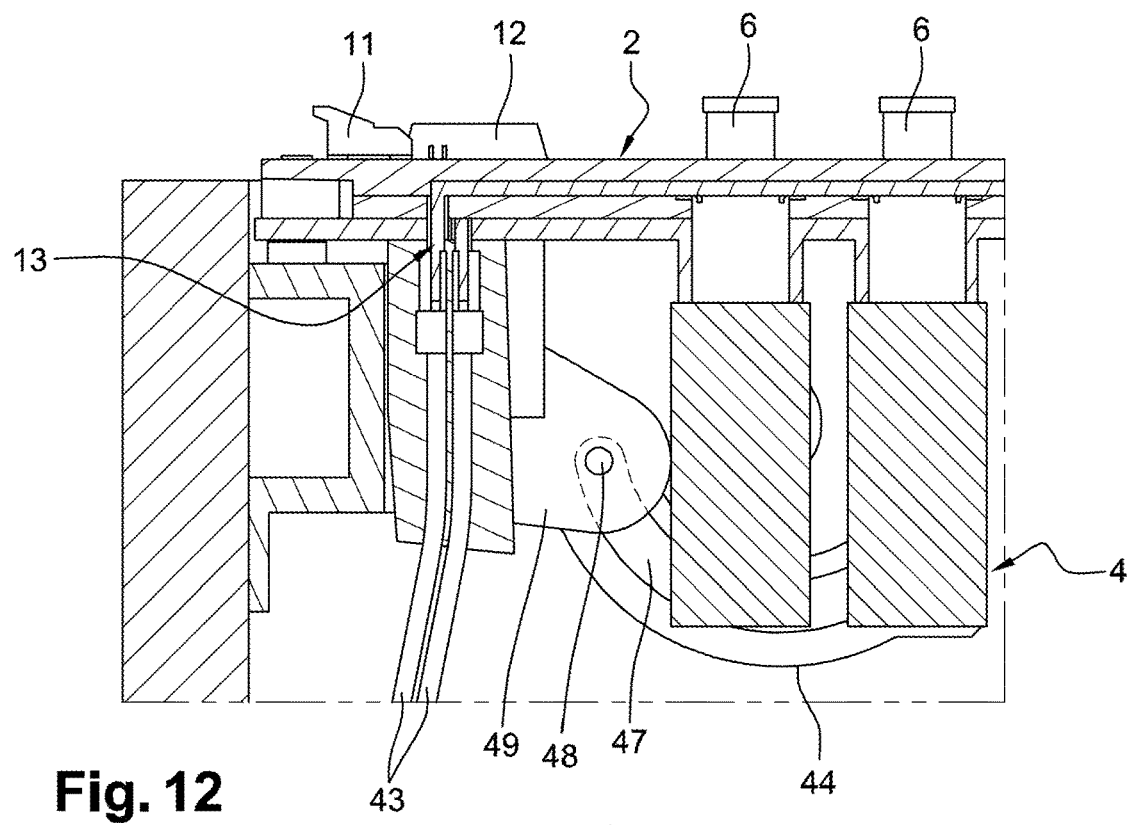
Figure 13:
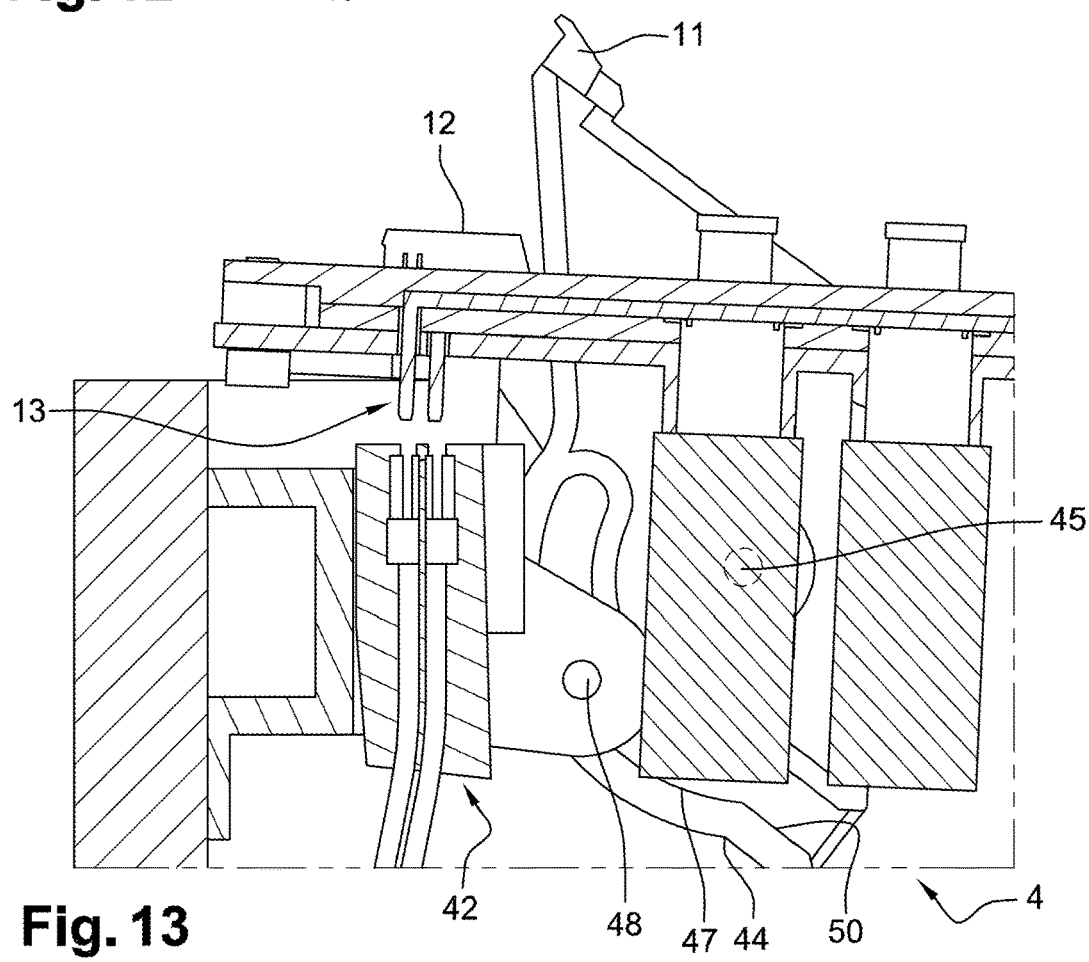

The invention will now be described in more detail by means of the following figures, which describe an embodiment thereof, which is preferred but purely illustrating:

FIG. 1 illustrates a cabinet in the closed state;

FIG. 2, the inner face of its door and the arrangement of the circuit breakers;

FIG. 3, the steps of assembling or disassembling circuit breakers;

FIG. 4, the manner in which the circuit breakers are mounted by interlocking;

FIG. 5, the insertion of the tips of the circuit breakers through the door;

FIG. 6, the manner in which the circuit breakers are electrically connected;

FIG. 7, an isolated circuit breaker;

FIG. 8, a cell for assembling a circuit breaker;

FIG. 9, the components of the door structure, including the components of electrical circuits;

FIG. 10, one of these electrical components;

FIG. 11, a part of the assembly of the components;

FIG. 12, the mechanical and electrical connection in the closed state of the door;

FIG. 13, the disconnection upon opening the door;

and FIG. 14, a complementary view of the cabinet upon opening the door.

FIGS. 1 and 2 show a cabinet embodiment in accordance with the invention. The cabinet comprises a rectangular cross-section cabinet body 1 and a door 2, connected to the cabinet body 1 by a hinge 3 and that can assume a closing position, represented in FIG. 1, in which it extends in front of an aperture of the cabinet body 1. The cabinet body 1 can be fastened to any structure not represented in detail, such as an aircraft wall, for example, but the invention is not limited to a particular technical field. The inner volume of the cabinet, that the door 2 encloses, can be filled with various pieces of equipment and electrical circuits. The door 2, the inner face of which is illustrated by FIG. 2, supports circuit breakers 4 and 5, each six in number in this embodiment, which are housed in the inner volume of the cabinet when the door 2 is closed, and provided with tips 6, which pass through the door 2 and thus point outwardly from the cabinet. In this embodiment, the circuit breakers 4 and 5 are of two types: the circuit breakers 4 are clamped on bases 7 projecting on the inner face of the door 2, by screwing nuts 8 around their tips 6 from outside the cabinet, in accordance with a conventional fastening mode; but the circuit breakers 5 are more characteristic of the invention: they are provided with interlocking levers 9 which enable them to be retained in place, on bases 7 in accordance with those preceding them, after they however have been engaged in guiding cells 10. Their tips 6 thereby do not need to be screwed to the door 2.

The door 2 further comprises, outwardly, a handle 11 for latching to the cabinet body 1, located opposite the hinge 3 and locked in a latching position on an interlocking tab 12. And the inner face of the door 2 includes, not far from the handle 11, an electrical movable connector 13.

FIGS. 3 to 8 illustrate the circuit breakers 5 and their mechanical and electrical assembly in the door 2. The levers 9 include two rock arms 14, movable about aligned hinges 15 located on two opposite sides of the circuit breakers 5, and a clevis 16 joining the arms 14. The circuit breaker 5 in the right of FIG. 3 will be inserted in its cell 10 (or has just been extracted therefrom), and the lever 9 is folded sidewise; the middle circuit breaker 5 is in place in its cell 10, but is not mounted in the door 2; and the lever 9 of the left-hand circuit breaker 5 has been lifted, the clevis 16 above its upper face 17, up to pass above an interlocking tab 20, which thereby retains the clevis 16 against a bar 18 belonging to a cage 19 gathering the cells 10, which retains the lever 9 stationary, as long as the interlocking tab 20 has not been pressed on to release it.

FIG. 4 shows that, in this situation, sector gears 21 of the arms 14 of the lever 9 are held meshing with the teeth of the racks 22, set on a side face of notches 23 of the corresponding cell 10, these notches 23 sinking in perpendicular to the thickness of the door 2, thereby holding the sector gears 21 under the racks 22 and thus preventing the circuit breakers 5 sunk in the cells 10 for being extracted, although no nut is screwed to the tip 6. But if the lever 9 is rocked sidewise, as has been represented on the right-end circuit breaker of FIG. 4, the teeth of the sector gears 21 and of the racks 22 are disjoined and moved sufficiently away from each other for the circuit breakers 5 to be extracted, and then put back in their cell 10.

FIG. 5 shows that a centring cone 24 which enables the tip 6 to be guided through a bore 25 being an extension thereof and passing through the door 2 passes through the bases 7. It also shows that the circuit breakers 5 include portions of electrical connectors, as rigid tongues 26, on either side of the tip 6 and which are directed to the same direction as the same, which sink into notches housing complementary portions of the connectors which are flexible contacts 27, joined to movable portions 28 of the electrical circuits passing through the circuit breakers 4 and 5. These movable portions 28 are nested in the door 2, which, as can be seen in FIGS. 6 and 9, has a laminated structure with different layers, between which the movable portions 28 of the circuits extend, by being insulated from each other without being flush outside the cabinet nor in the inner volume thereof. More generally, an advantageous aspect of analogous embodiments of the invention is, in cooperation with the cells 10 for guiding the circuit breakers 5, a construction of the conducting portions of the connectors and complementary connectors with a main extension in the direction of guiding the circuit breakers 5 by the cells 10 and a face-to-face arrangement, such that the conducting portions attached to the circuit breakers 5 slide on the conducting portions attached to the door 2 during the end of movement of inserting the circuit breakers 5, which ensures the proper connection. The conducting portions can be elastic or rigid pins, tongues, tubes, etc.

And the interlocking means such as the levers 9 also enable holding the connection to be ensured regardless of the shape of the conducting portions for connecting to the circuit breakers 5, by holding them at an invariable position.

A same arrangement can be advantageously retained for the connectors and complementary connectors (the interlocking tab 12 and the movable connector 13) which link the portions of the electrical circuit related to the door 2 and to the cabinet body 1 when the door 2 is closed: these elements have a main direction of extension in the direction of closing and opening the door 2.

Different constructions of the connectors, comprising supports of planar contacts or flexible blades for example, however remain possible and remain within the definition of the invention.

One embodiment of the door 2 is represented in detail in FIG. 9. The door 2 comprises a main plate 29 carrying the hinge 3, an upper plate 30, carrying the cage 19 and bases 7 as well as a centring pin 52 which will be described later, and an intermediate plate 31 extending between the previous ones, to form its structure. It further comprises:

a first group of three bus bars 32a, 32b and 32c, and a second group of three bus bars 32d, 32e and 32f, said bars each extending between one of the flexible contacts 27 and a connection pin 33;

a large bus bar 32g, carrying six portions of flexible contacts 27 together and a pin 34; and a printed circuit 35 (best represented in FIG. 10) carrying twelve portions of the flexible contacts 27 and of pins 36.

The bus bars 32a to 32f are all of different shapes and different, in particular, sinuous lengths. Those of the first group 32a, 32b and 32c are housed in grooves 37a, 37b and 37c, set at the surface of the intermediate plate 31 so as to remain housed therein, the flexible contacts 27 and the pins 33 projecting outwardly therefrom. The irregular and sinuous shapes enable the bus bars 32a, 32b and 32c to be retained in place, while avoiding them to cross each other, by also bypassing the bores 38 for passing through the tips 6. The bus bars 32d, 32e and 32f of the other group are likewise set in grooves associated therewith but below the previous ones, at the surface of the main plate 29, without these grooves being represented in detail. The bus bar 32g is housed in another groove 39, of a shape adapted to receive it with little play, at the surface of the main face 29 between both rows of six bores 40 for passing the tips 6 therethrough. And the printed circuit 35 is also housed in a groove 41 of the main plate 29 having a shape adapted to receive it with little play, this groove extending above one of the rows of bores 40.

The intermediate plate 31 comprises bores for the flexible contacts 27d, the pins 33, 34 and 36 of the bus bars 32d, 32e, 32f, 32g and of the printed circuit 35. And the upper plate 30 comprises likewise bores for the same elements, as well as for the flexible contacts 27 and the pins of the first group of bus bars 32a, 32b and 32c of those of the three bus bars 32a, 32b and 32c.

FIG. 11 represents part of the assembly obtained. It can be seen that the pins 33, 34 and 36 are portions of the movable connector 13.

It is evident that although other arrangements are possible to house these portions of the electrical circuits within the door 2, the arrangement represented is only an example. The number of the distribution and arrangement of the circuit breakers 4 and 5 can likewise be chosen fairly arbitrarily. The circuit breakers 4 have the same properties as the circuit breakers 5, except that they are free of levers 9.

The description of the last figures of this description will now be made.

FIG. 12 illustrates in a cross-section view the cabinet in the closing state of the door, and the latching state by interlocking with the tab 12. It is noticed that the pins of the movable connector 13 are engaged in a complementary fixed connector 42, inside the cabinet body 1 and to which first portions of the electrical circuits leading to the circuit breakers 4 and 5, consisting of fixed cables 43, terminate. The traditional harnesses of movable cables in the cabinet are thus removed and replaced by the electrical components already described, integral with the door 2.

To cover the door 2 and switch to the state represented in FIG. 13, the handle 11 has to be disengaged from the interlocking tab 12 and the door 2 has to be rotated about of the hinge 3, which separates the movable connector 13 from the fixed connector 42, insulates the circuit breakers 4 and 5 from the rest of the electrical apparatus and enables them to be handled without fear and without more precautions. Opening the door 2 is made by rocking the handle 11 by a sufficient angle, so as to rotate side panels 44 it carries, and which are located on both sides of the cabinet body 1, about hinge pins 45 mounted to flanges 46 of the door 2: the side panels 44 carry spiral grooves 47 in which pins 48, erected on flanges 49 of the cabinet body 1 can penetrate. In the closing state of FIG. 12, the pins 48 are in the bottom of the spiral grooves 47, and attempts to rock the door 2 to directly open it would be unsuccessful, since the pins 48 would touch the flanks of the grooves 47. But as the handle 11 rocks, the grooves 47 slide along the pins 48, until they reach an opening part 50 of the grooves 47 corresponding to the spiral part: it is thereby possible to release the handle 11, by bluntly opening the door 2.

Reclosing the door 2 is made by a reverse operation. It will be noted that the centring pin 52 enters a corresponding trough 51 of the fixed connector 42, which ensures proper matching of the movable connector 13 to the fixed connector 42.

What is claimed is:

1. An electrical cabinet, comprising a cabinet body and a door movable on the cabinet body between a cabinet closing position and an opening position, circuit breakers mounted to the door and extending in the cabinet when the door is closed, and electrical circuits each comprising a first part attached to the cabinet body, and a second part passing through a respective circuit breaker, wherein the second parts are fastened to the door and extend between first connectors, connectable to first complementary connectors, attached to the first parts of the circuits, in the closing position, and second connectors, connectable to second complementary connectors attached to the circuit breakers; the door has a laminated structure with superimposed layers wherein the second parts of the circuits are nested between the superimposed layers of the door.

2. The electrical cabinet according to claim 1, wherein the door includes cells for guiding the circuit breakers, and the door and the circuit breakers include interlocking means.

3. The electrical cabinet according to claim 2, wherein the interlocking means comprise rock levers.

4. The electrical cabinet according to claim 3, wherein the rock levers are mounted to the circuit breakers and include each a sector gear about a hinge pin, which meshes with a toothed rack formed in a notch adjacent to a respective cell.

5. The electrical cabinet according to claim 2, wherein the second connectors and the second complementary connectors comprise conducting portions mainly extending in a direction of guiding the circuit breakers by the cells, said conducting portions of the second complementary connectors sliding on said conducting portions of the second connectors.

6. The electrical cabinet according to claim 1, wherein the second parts include either bus bars or printed circuits.

7. The electrical cabinet according to claim 1, wherein the second parts are received either in intermediate layers of said laminated structure of the door or in inner faces of end layers of said structure.

8. The electrical cabinet according to claim 1, further comprising a hinge connecting one end of the door to the cabinet body, and the door comprises a latching handle provided with a relief nested with a complementary relief of the cabinet body, in a closing and latching position of the door.

9. The electrical cabinet according to claim 8, further comprising complementary interlocking means on the handle and the door, when the door is in the latching position.

10. The electrical cabinet according to claim 8, further comprising centring means distributed on the door and the cabinet body, and mutually contacting in the closing position.

11. The electrical cabinet according to claim 1, wherein the first connectors and the first complementary connectors comprise conducting portions mainly extending in a direction of guiding the circuit breakers by cells for closing the door, said conducting portions of the first complementary connectors sliding on said conducting portions of the first connectors.

12. The electrical cabinet according to claim 1, wherein the circuit breakers are mounted on an inner face of the door, and are at least partly housed in a volume of the cabinet comprised between the door and the cabinet body when the door is closed.

13. The electrical cabinet according to claim 12, wherein the circuit breakers are provided with tips which pass through the door and point outwardly from the cabinet.

14. The electrical cabinet according to claim 1, wherein the second parts are incorporated in the door, being housed in grooves made in said layers of the laminated structure of the door.

15. An electrical cabinet, comprising
a cabinet body and
a door movable on the cabinet body between a cabinet closing position and an opening position, circuit breakers mounted to the door and extending in the cabinet when the door is closed, and electrical circuits each comprising
a first part attached to the cabinet body, and
a second part passing through a respective circuit breaker, wherein the second parts are fastened to the door and extend between first connectors, connectable to first complementary connectors, attached to the first parts of the circuits, in the closing position, and the circuit breakers mounted in the door, layers consisting in plates contacting each other, wherein the second parts are incorporated in the door, being housed in grooves made in said layers of a laminated structure of the door.

16. The electrical cabinet according to claim 15, wherein the circuit breakers are connected to said second parts of the electrical circuits by second connectors attached to the second parts and complementary second connectors carried by the circuit breakers, the second connectors being connectable to the second complementary connectors, and the door includes cells for guiding the circuit breakers up to a position in which the second connectors are connected to the second complementary connectors.

17. The electrical cabinet according to claim 15, wherein the door comprises three of said layers, and said second parts are arranged in a plurality of groups insulated from each other and respectively extending between different pairs of said plates.

* * * * *